(12) United States Patent
Irons

(10) Patent No.: US 9,970,208 B2
(45) Date of Patent: May 15, 2018

(54) ECOLOGICAL SYSTEM MODEL FOR A SELF-SUSTAINING AND RESILIENT HUMAN HABITATION ON THE MOON AND MARS AND FOR FOOD SECURITY AND CLIMATE CHANGE MITIGATION ANYWHERE ON EARTH

(71) Applicant: Morgan Arena Irons, Norfolk, VA (US)

(72) Inventor: Morgan Arena Irons, Norfolk, VA (US)

( * ) Notice: Subject to any disclaimer, the term of this patent is extended or adjusted under 35 U.S.C. 154(b) by 0 days. days.

(21) Appl. No.: 15/646,094

(22) Filed: Jul. 11, 2017

(65) Prior Publication Data

US 2018/0016804 A1    Jan. 18, 2018

Related U.S. Application Data

(60) Provisional application No. 62/362,972, filed on Jul. 15, 2016.

(51) Int. Cl.
*E04H 1/00* (2006.01)
*C05B 17/00* (2006.01)
(Continued)

(52) U.S. Cl.
CPC ............... *E04H 1/005* (2013.01); *A01G 9/14* (2013.01); *A01G 9/18* (2013.01); *A01G 9/247* (2013.01);
(Continued)

(58) Field of Classification Search
CPC ........... E04H 1/005; E04H 5/08; A01G 9/247; A01G 9/18; A01G 9/14; E04B 1/32; E05B 17/00
See application file for complete search history.

(56) References Cited

U.S. PATENT DOCUMENTS 2,604,268 A * 7/1952 Skagerberg ........... F24F 5/0046
237/1 R
3,789,560 A * 2/1974 Wood ...................... E04H 1/005
52/236.1
(Continued)

FOREIGN PATENT DOCUMENTS

DE  2254373 A1 * 5/1973  ......... E04B 1/34846
EP  3098366 A1 * 11/2016  ............. E04H 1/005
(Continued)

*Primary Examiner* — Jeanette E Chapman
(74) *Attorney, Agent, or Firm* — Dunlap Bennett & Ludwig PLLC

(57) ABSTRACT

An ecological system model for a self-sustaining and resilient human habitation on the Moon and Mars and for food security and climate change mitigation anywhere on Earth. It takes into account the ecological and biological theories and principles by which Earth ecosystems function and applies this knowledge to the establishment of a closed ecological system that mimics the self-sustaining and resilient capacity of Earth. Three zones are used for human habitation, agriculture, and ecological buffer. Expedited primary succession is used to initially establish the agricultural zone and ecological buffer zone with fully functioning biogeochemical cycles and ecological services. Competitive redundancy ensures the security of the food crops while maintaining the biodiversity of plant species. Ecological service reservoirs provide the additional buffering capacity that would normally be supplies by surrounding ecosystems on Earth.

4 Claims, 2 Drawing Sheets

(51) Int. Cl.
    *E04B 1/32*     (2006.01)
    *E04H 5/08*     (2006.01)
    *A01G 9/14*     (2006.01)
    *A01G 9/18*     (2006.01)
    *A01G 9/24*     (2006.01)

(52) U.S. Cl.
    CPC ............... *C05B 17/00* (2013.01); *E04B 1/32* (2013.01); *E04H 5/08* (2013.01)

(56) References Cited

U.S. PATENT DOCUMENTS

| | | | | |
|---|---|---|---|---|
| 3,955,328 A * | 5/1976 | Lindsay | ............. | E04B 1/348 4/900 |
| 4,141,498 A * | 2/1979 | Marschner | ............ | F24D 11/003 126/628 |
| 9,222,273 B2 * | 12/2015 | Webb | ................. | E04H 1/005 |
| 2003/0074895 A1 * | 4/2003 | McFarland | ............ | F01K 25/10 60/395 |
| 2006/0180707 A1 * | 8/2006 | Dorfman | ................ | B64G 9/00 244/158.1 |
| 2007/0200033 A1 * | 8/2007 | Bigelow | .................. | B64G 1/12 244/158.3 |
| 2008/0000168 A1 * | 1/2008 | Bigelow | .................. | B64G 1/52 52/2.11 |
| 2011/0146166 A1 * | 6/2011 | Noble | .................... | B64G 9/00 52/167.1 |
| 2011/0214364 A1 * | 9/2011 | Fuller | ..................... | E04F 17/00 52/173.3 |
| 2016/0333568 A1 * | 11/2016 | Burger | ...................... | E04B 1/32 |
| 2017/0145706 A1 * | 5/2017 | Wee | ......................... | E04H 1/005 |

FOREIGN PATENT DOCUMENTS

| | | | | |
|---|---|---|---|---|
| FR | 2241665 A1 * | 3/1975 | ............... | E04B 1/19 |
| JP | 2002129767 A * | 5/2002 | ............. | E04H 1/005 |
| WO | WO-03056117 A1 * | 7/2003 | ............. | E04H 1/04 |
| WO | WO-2007054986 A1 * | 5/2007 | ............. | E04H 1/005 |
| WO | WO-2013044629 A1 * | 4/2013 | ............. | E04H 1/04 |

* cited by examiner

ECOLOGICAL SYSTEM MODEL FOR A
SELF-SUSTAINING AND RESILIENT
HUMAN HABITATION ON THE MOON AND
MARS AND FOR FOOD SECURITY AND
CLIMATE CHANGE MITIGATION
ANYWHERE ON EARTH

CROSS-REFERENCE TO RELATED
APPLICATIONS

Provisional Patent—U.S. Application No. 62/362,972, Filing Date: Jul. 15, 2016, Name of Applicant: Morgan Arena Irons, Title of Invention: Model for establishing a self-sustaining, resilient, healthy closed ecological system on Mars

STATEMENT REGARDING FEDERALLY
SPONSORED RESEARCH OR DEVELOPMENT

Not Applicable

REFERENCE TO SEQUENCE LISTING, A
TABLE, OR A COMPUTER PROGRAM LISTING
COMPACT DISC APPENDIX

Not Applicable

BACKGROUND OF THE INVENTION

Field of Endeavor

The present invention involves the systems and methods for establishing and maintaining a self-sustaining and resilient human habitation system on the Moon and Mars. In addition, the invention can be used for an agricultural system on Earth that provides food security and climate change mitigation.

Subject Matter

The invention includes a Three-Zone Model for maintaining an environment in which healthy plants can be grown despite the local climate and weather (A01G 9/18, 9/24. 9/246, 9/247, 15/00), which is in a closed configuration shaped to shelter the Three-Zone Model (Y10S 52/14). It includes the methods of (a) competitive redundancy that uses horticulture and breeding for the cultivation of vegetables that ensures food security (A01 G 1/001, Y10S 4/01) and (b) expedited primary succession that uses plant husbandry for the remediation of soil (Y10S 47/905). It also includes ecological service reservoirs, a hybrid system that integrates ecosystem services as renewable energy sources into a building (Y02B 10/70) and provides agricultural climate change mitigation technology that functions as a greenhouse by collecting solar energy (Y02P 60/124) and prevents losses of this energy using closed construction measures (Y02P 60/148), as well as performs activities beyond agriculture of green-house-gas capture and human life support (Y02P 60/18).

State of Technology

Bringing life into space became a reality when the Soviet Union launched their first cosmonaut into near-Earth orbit on Apr. 12, 1961. Since then, researchers worldwide who are devoted to human space exploration have set out to create new technology and techniques that will allow humans to survive for longer periods of time in the extreme environments of space. To support life beyond the bounds of the earth's atmosphere, closed systems are created to provide the material and energy vital for human survival (Gunga 277-78). As closed systems, they would be required to function in isolation without material or energy support from Earth.

It is easier to visualize closed systems on a small scale in order to understand how they can be isolated. Open systems work on a large scale through interaction and dependence on extended resources—for example, a forest interacting with a stream that comes out of the distant mountains and flows through it. An example of a small-scale system is the International Space Station (ISS), which has been supporting humans since 1998 using engineered Environmental Control and Life Support (ECLS) systems. However, it must be noted that being located in Low Earth Orbit (LEO), the ISS is able to be periodically opened and restocked with necessities and repairs relatively quickly and efficiently, allowing it to remain in relative stability (Gunga 275). Thus, it is a closed system with a limited term.

Since the end of the American Apollo Program, endeavors requiring humans in space have been limited to LEO. These missions have been necessary for developing science and technology to improve life on Earth and to enable humans to survive in space while studying the physical harm and health problems that result from extended periods in micro-gravity and a higher radiation environment and how to mitigate them. However, these are not the only mission scenarios that scientists and researchers want to accomplish. Governmental agencies such as the National Aeronautics and Space Administration (NASA), the China National Space Agency, and the Russian Federal Space Agency—Roscosmos—, as well as private business interests such as Space X, Bigelow Aerospace, and Blue Origins are seeking to extend human habitation further into space through interplanetary flight and colonization. The success of the joint operation between NASA and Roscosmos—commonly called, A Year in Space—with astronaut Scott Kelly and cosmonaut Mikhail Kornienko, has further brought attention to the future of living in space (Thompson 2016). To eventually reach the goal of becoming an interplanetary species, the development of a more sustainable closed system capability than what is currently in use is essential. The key word here is sustainable—the ability to function over extended periods of time using a limited and fixed set of material resources without resupply from Earth and adapt resiliently to natural and especially unexpected perturbations.

With the reinvigorated goal of sending people to Mars, more emphasis has been placed on furthering a century's worth of research to build closed systems that are sustainable over years without the ability to send immediate support due to the increased distance. NASA proposes the need for such a system to be independent of Earth support for up to 1100 days due to the inability to send repair and rescue teams within emergency time frames, as well as the budget limitations that constrain the amount of repair and replacement parts that can be shipped in advance and stocked at the planetary station (NASA 2015).

Various closed system models from the past century and modern day have been tested in the pursuit of human space travel, but with limited success. Analyzing the systems and their successes and failures, it becomes clear we have not created the closed system that will enable us to establish a sustainable presence on Mars.

The Human-Technology Model: How closed a system is depends upon the extent of necessary integration of matter and energy exchange with outside sources, such as regular resupply of materials, expulsion of trash, repowering electrical systems using solar panels, and the escape of heat by conduction and radiation. For space travel, we consider in-situ resources at the location of the closed system a part of the closed system. Resources that would only be accessible using the support of humans who are not at the location of the closed system are not part of the closed system. This definition of a closed system meets the Earth-independence criteria of sustainability. Would a closed system comprised of humans and technology be able to accomplish Earth-independence?

One of NASA's current projects, the Hawaii Space Exploration Analog and Simulation (HI-SEAS), is an experiment focused on simulating life on Mars by isolating six astronauts in a closed system dome on the volcanic slopes of Mauna Loa. In the dome, the crew members do not grow their own food, but rely on technology and instant foods to keep them alive. What is the reason for supplying food instead of growing their own? NASA states that for missions where the primary goal is not living for long periods of time on a planet (a short-term research mission for 1-3 years), a prepackaged food system is efficient and manageable enough to sustain the astronauts. However, for a long term mission that consists of creating a permanent outpost or colony, most if not all of their food would need to be grown right there at the settlement (HI-SEAS 2012). Another research component of HI-SEAS is how much food storage would be needed for a trip to Mars. NASA realizes the importance of solving the food system problem as soon as possible due to the resources and planning that need to go towards its transport: "the food system requires significant resources: tons of food and packaging mass to be lifted into space, volume for storage, inventory monitoring, nutritional monitoring, water and power and equipment for food preparation and possibly cleanup," and time to manage the food and waste materials (HI-SEAS 2012). As stated, food increases the load, takes up space, and requires time and other measures to make sure there is enough to last the entire trip, while also keeping it safe from damage. Relying on a limited supply of food to survive is dangerous and impossible for long-term missions, revealing the need for an ecological component of the closed system. HI-SEAS is not the only experiment that is being done on closed system usage for trips to Mars. The Mars500 experiment in Russia and the Mars Desert Research Station in Utah are two others that focus or have focused on the human-technology model system for short-term missions.

To establish a human presence on Mars using this model, enough supplies would have to be provided to support the humans and the technology for 1100 days, according to the NASA criterion. Though it is physically possible to provide a Mars base with sufficient food supplies, advanced technology to be able to survive on Mars, and sufficient spare parts for the advanced technology, the cost of the supply chain between Earth and Mars would likely be politically unsustainable for a permanent human presence.

As noted earlier, the ISS is an example of a closed system with a limited term. It can function independent of material support from Earth for some amount of time, but does require periodic resupplies from Earth to keep the engineered ECLS systems functioning and provide food for the humans. Regarding the safety of the humans on Mars, we can also look to the ISS example. If a problem were to occur on the ISS, leading to a need to evacuate, Soyuz capsules can be used to evacuate immediately and be back on the ground within the hour, or if less urgent, it can take several days/weeks to send support (Gunga 275). If the technology were to fail our humans on Mars and there were insufficient spare parts or time to fix the technology, an emergency evacuation of the humans from Mars would be more difficult, being at a much greater distance from Earth, with a high cost to maintain such a capability. It is probable that the first-time humans use such an evacuation from Mars, the political consequences would lead to ceasing human habitation of Mars for some period of time.

Based on the HI-SEAS and ISS case studies, we find it unlikely that any effort at placing humans on Mars using a human-technology model would do so with intent to maintain a human presence on Mars. The known cost and risk of greater cost would both likely be too great. If the goal is to create closed systems that are sustainable for human habitation on Mars, using solely the human-technology model is not feasible.

The Human-Biology-Technology Model: The weakness of the human-technology model for a sustainable closed system for human life support in space has driven research for incorporating biology into the model. Biology brings the ability to replace functions performed by technology without requiring spare parts due to its regenerative qualities. Closed systems that incorporate biology are known as closed ecological systems, or CESs. CESs work on a human-biology-technology model to integrate the use of biological mechanisms with technology to provide a way to support humans in an artificial ecology for longer living periods in space. The research and development on CESs has become closely associated with biospherics—a relatively new field that has two main purposes behind its study: determining the mechanisms that enable Earth to remain a stable and sustainable closed ecological system through modeling CESs, and sustaining humans on distant space flights through the development of "closed human life support systems"—also known as CESs (Gitelson et al. 2).

In the realm of biospherics, a CES theoretically can be built to recreate a sustainable, natural system separate from Earth—the system providing life support for living things through the use of natural processes and the ability of biology to provide regenerative capabilities to the system.

The Earth is the foundational model in the development of CESs. In the realm of outer space, Earth is a large scale CES, consisting of different biomes, where the most notable exchange occurring outside its boundaries is the energy it exchanges with outer space. In the development of CESs, the knowledge of how Earth functions naturally is utilized to create small-scale research models that eventually lead to larger, functional, manmade CESs.

Technology is a necessity in space exploration; however, over time, parts experience wear and tear and can be damaged by space debris, temperature fluxes, and other elements of the space environment, giving them a time limit to how long they can last. Chemical supplies utilized in the system will also be depleted and must be replaced. Thus, the cost-limited ability to send and have a supply of replacement parts is a sustainability problem. A shuttle or rocket carrying all the supplies and parts has a limit on its load amount and weight. Providing a space crew with all the replacement parts they could need for 1100 days increases the load, which effects the amount of fuel required to put and keep the ship in flight—raises the cost—, as well as the ability to bring other necessities, such as food and scientific equipment. Thus, determining alternatives to reduce down on the need of resupply and repair of technological parts is not only desirable, but necessary. In regards to a CES, it provides the unique advantage of providing natural alternatives to man-made materials, leading to the creation of a bio-regenerative system.

Biology has regenerative capabilities that allow for the renewal and replacement of any part of a plant or entire system that is damaged or disturbed. When a problem occurs within an ecosystem, the system has natural processes put in place by years of natural selection and evolution that allow it to recover. The different parts of an ecosystem that allow for this natural resilience can provide systematic processes that engineers developing space habitation modules tend to replace with technology. Technology has become a go-to solution to the everyday problems humans face; however, depending solely on it for a space-based settlement will increase the need for resupplies as damages and malfunctions occur, which prevents the settlement from becoming earth-independent. Here we provide some examples of bio-regenerative engineered ECLS systems and common problems associated with space habitation.

Current air revitalization technology utilized for space habitation is based on LiOH chemical treatments and scrubber systems. A resupply of the chemical used in the scrubbers would be needed to allow for the continued cleaning of the modules atmosphere as well as any replacement parts for the system as time passes. Such a system is non-sustainable if a resupply from earth is constantly needed. On earth, a natural air scrubber system is already in place. Plants clean and regulate chemicals in the air during photosynthesis, respiration, as well as through the symbiotic relationships they have with the microbes along their root systems. The natural process of decomposition also provides for the regulation of certain gases in the atmosphere. To maintain air quality in a CES, the plants utilized for agriculture and other services could be used as a natural scrubber system. The use of biofilters, a biotechnology that utilizes microorganisms, plants, wind, and water, could also replace current air revitalization systems.

For any system to run—technology or biology based—a constant energy source is required. A settlement on Mars will have the disadvantage of having the most readily available energy source in the solar system further away: the sun. Even with the use of solar panels, the energy that would be captured would also be intermittent depending upon the location of the CES on a planet's surface. The threat of space debris damaging the panels is also a concern. The use of alternative primary and backup sustainable energy sources that can remain inside the CES would allow for the CES not to become dependent on an external energy source and technology to capture that energy. This ecological alternative comes in the form of chemotrophic organisms and other natural energy producers. Chemotrophic organisms could provide energy to the artificial part of the system without the need of light (Gitelson et al. 73). Or, for missions closer to the earth and the sun, algae can be utilized as another regenerative source of chemical energy.

U.S. Pat. No. 8,978,293 B2 is an example of a bio-regenerative engineered ECLS system designed to provide life support on Mars using the in-situ resources of Mars, such as water. It is designed to support a Martian greenhouse and/or hydroponics systems for growing food. It is a typical engineered system, meeting standard engineering principles of function and performance, redundancy as needed to mitigate the risk of downtime, and do so at minimal life-cycle cost. It eliminates the need for some spare parts by incorporating bio-regenerative technology, thus reducing earth-to-mars supply chain costs. For example, it replaces LiOH chemical treatments and scrubber systems with microalgae to produce oxygen. Consider such a system operating on a Mars base. All systems are up and running with the system growing food. The base is near the end of an 1100 day run at which point it will get a resupply of some spare parts from Earth. Before the resupply comes in, Microalgae Bioreactor Line 1 fails to produce oxygen. This is a critical system, so it has a redundant Line 2 that can be operated while trouble-shooting and fixing line 1. Then line 2 goes down before the problem with line 1 has been determined and fixed. Given time to investigate what went wrong, it is discovered that all of the microalgae died in both lines. What killed the algae? Did the epigenetics or genetics evolve to a non-functional state in the alien environment of lower gravity and higher ambient radiation? Is there an alien bio-vector present in the Martian environment that had not been discovered yet and that killed the algae? Maybe a trace chemical in the Martian water? This kind of problem takes years for biologists to figure out, but Martian explorers don't have years. They have to make a decision now on whether to do a forced evacuation. This case study reveals the problem with using biology to replace technology in an engineered system. When it comes to redundancy, biology does not act the way technology does. If a biological component fails, it cannot necessarily be replaced with a matching biological component. To further understand why this is the case, an understanding of ecosystems and the services they provide are necessary.

Ecosystem services, a name given to the functions and processes of the environment that affect and benefit humans and other organisms, are divided into four categories: provisioning, regulating, cultural, and supporting. Provisioning services are products gained from the environment, such as food, genetic resources, fiber, water, fuel, etc. These services provide for the obvious needs of survival. Regulating services regulate ecosystem processes to allow a system to remain stable. Examples of regulating processes are climate, water, and disease regulation. Cultural services are not material-based, but instead provide for mostly non-physical needs of humans: spiritual needs, education, psychological health, cultural heritage, and recreation. The final category that makes all ecosystem services possible are the supporting services. This consists of soil formation, primary production, nutrient cycling, and other production cycles that provide the materials and conditions necessary for an ecosystem to support life (Zakri et al. 2003).

Ecosystem services are based on the services found on earth. The use of biology to provide support in the CES allows for the presence of ecosystem services in the system. A few examples of such services are mentioned as ecological alternatives in the previous section. Plants and microbes providing air quality control through their interactions with the atmosphere is an example of a regulating service. Having clean air allows for humans and plants to live in a more stable, habitable environment. The energy capture and conversion by chemotrophic organisms and algae provides the supporting service of supplying a source of renewable energy. Beyond the services the plants and other organisms provide for air quality and energy generation, they will also provide provisionary and cultural services. A person living in space needs a balanced and varied diet to not only provide him or her the needed nutrients, fiber, and vitamins, but also for their overall psycho-physiological health (Gunga 288). A CES's production unit, where the food is grown, needs to be able to provide and maintain a supply of crops that meet the demands of a human's body. Also, due to the extreme change in environment, a person's psychological health is at risk. By providing a familiar landscape, such as a natural landscape, the psychological well-being of the person can be put at ease (Clay 2001).

Other planets, such as Mars, will seem foreign to humans, which can be psychologically harmful. According to Stephen Kaplan, a professor of psychology and computer science and engineering at University of Michigan, the loss of the natural environment (in the realm of earth's system) in a person's life can lead to "directed attention fatigue," (Clay 2001) which astronauts experience in space over time. Such fatigue is not conducive to a healthy lifestyle (i.e. can lead to loss of appetite and motor skills), becoming dangerous to the health of an astronaut (Gunga 283). However, there is a solution to fix this problem. Stephan Kaplan continues that "If you can find an environment where the attention is automatic, you allow directed attention to rest. And that means an environment that's strong in fascination" (Clay 2001). The environment Kaplan is referring to is natural environments, green landscapes, which provide familiarity for an astronaut on a different planet and a change of scenery to their current environment.

The ultimate problem with habitation systems that do not provide a full ecosystem component for the humans is that they do not provide for adaptive resilience to the human occupants. Earliest archeological records have humans in small groups of hunter-gatherers, living in a locality in which they have become familiar with use of the natural resources. From there, humans adapted and evolved to an agrarian society in which they had a central support village and surrounding crop fields. Modern cities are what eventually came from this adaptive process. It can be said that one of the reasons for human survival is their ability to adapt quickly to unplanned events. A tribe of humans living in a cave deplete their local resources. They need to find more resources. They find them out in the wilderness outside of their known locality. Later in history, a local village is hit by blight against their main food crop. They go into the wilderness to find the food resources they need to survive until they can get to their next harvest. When a modern metropolitan area is hit by a hurricane supplies and resources came in from beyond the immediate agricultural zone surrounding the city. These examples reveal that the evolved ecological systems of Earth have always enabled human adaptation. Humans have evolved within this context. If humans are limited in the extent of natural ecosystem to which they have access, their ability to adapt to emergent situation could lead to the loss of human life.

Biosphere 2 was devised in the years 1980-90 and contains a seven biome system modeled after Earth's biosphere—Biosphere 1—that was expected to last for at least two years (Gitelson et al. 50-52). The seven biomes that were chosen are a desert, tropical forest, ocean, steppe, field, farm, and human habitat (Gitelson et al. 51). John Allen, one of the supervisors of Biosphere 2 states, "The purpose of the Biosphere 2 project is threefold: to elucidate the laws of biospherics; to create the corporate capacity to design, build, operate, and consult on the management of artificial biospheres; and to assist in the ecological improvement of the human impacts on Earth's biosphere." The researchers wanted to know "how self-regulating is a biospherics system" (Allen 1992). Thus, Biosphere 2 was built to create successful replications of ecosystems/biomes before incorporating the human component (an eight person live-in team). John Allen, Mark Nelson, and the other members of the USA team who worked on this project were focused on how to create a CES that could replicate the sustainable, resilient, and self-regulating characteristics of an earth biome. To accomplish such a feat, the USA team built a facility around 2 acres to hold 20 tons of biomass, consisting of 4000 species (Allen 1992). However, the expectation that the material cycle would remain stable and balanced once the biome was completed did not occur.

The initial oxygen levels in the CES dropped to a dangerous level, leading to a need to pump oxygen into the system, breaking open the "closed" material cycle (Gitelson et al. 51). On average, there is a 6.2% leak rate of air per year, making the system not fully closed (Allen 1992). The researchers incorporated buffer systems to try to counteract and stop such problems from occurring, or to lessen the consequences that would ensue—e.g. pH buffer system for the ocean's artificial coral reef; however, it is near impossible to prepare for all problems, making it essential to understand ecology and the components and processes that are needed to create an ecosystem, let alone a CES. One of the conclusions the researchers came to is a biome cannot automatically close its material cycle (Gitelson et al. 51). In landscape ecology, biomes with their ecosystems are complex structures that are able to remain stable due to material exchange the system has with other systems, creating a dynamic equilibrium. As stated before, a CES does not allow for material exchange outside of the system, making the system a treacherous place for biomes that require that exchange to survive. By the Biosphere 2 team not considering this need, problems, such as the oxygen decrease, started to occur, leading to the need for outside help, making the Biosphere 2 experiment a "failure" in the eyes of some people. Yet, the "failure" of Biosphere 2 has led to the gaining of more knowledge on what needs to be considered when building CESs, and what questions we should be asking. Biosphere 2 has revealed that we can't just create a greenhouse on Mars (e.g., U.S. Pat. No. 9,161,497 B2, U.S. Pat. No. US 2015/0237812 A1) or a "Noah's Ark" of plants from Earth (e.g. U.S. Pat. No. 3,749,332), and expect the system to work.

References to Invention

The purpose of a CES is to support human life without the need for material exchange outside of the system. If the focus of a CES should be the human component, we suggest that the system is similar to an urban human ecosystem and, therefore, should be treated similarly to the urban human ecosystem on Earth. In urban ecology, urban covers consist of "vegetation, surfaces, and buildings" (Pickett et al. 2008). The plants not only provide a food source, but also contribute to the urban mosaic throughout the spatial landscape. To allow humans to survive and live comfortably, ecological processes can be utilized to make technology and other engineered structures more efficient (e.g. green roofs protect from the urban heat island effect). It also plays a role in the feedbacks that occur between the vegetation and the performance of the plant species, and the human active and social interactions with the system (Pickett et al. 2008). In a CES, the biology and technology components perform and react similarly. As stated before, technology and biology can and need to be utilized to help each other and create a balance between each other's feedbacks and processes. In the urban ecology context, it is the human contribution or feedbacks to the system that influences the structure and function of the technology and biology (Pickett et al. 2008). However, the urban ecology is not the only thing that makes up our human ecosystem.

When designing a CES, the question of when the human component should be introduced needs to be answered. The biology-technology model focuses on the biology of the system before integrating humans, and the human-technology model introduces people from the start. With a biology-technology model, the focus is on how to incorporate biology to create a sustainable system that could eventually sustain humans as well. However, a biology-technology model can fail to be resilient. For the human-technology model, the focus is developing a system that provides directly for human needs. Any plants that are introduced are food crops growing in an engineered system that minimizes resource use. Even though this might seem better and closer to the goals of a CES in space, this still creates an unstable system due to failing to comprehend biological failure modes.

When integrating humans with biology into a technological CES invention, it is imperative that knowledge and ideas from ecology, biology, and the other natural sciences are considered and integral in the design of the CES and the process of building it. Stability in an ecosystem occurs when all of the biotic feedbacks, transitions between disturbances, levels of biodiversity, interactions between living things, buffers, and services are in relative balance and are provided for within the system. In other words, the ecosystem needs to be built to be self-organizing and self-sustaining. If this is not achieved, the system will fail, like Biosphere 2.

The first need of the invention is to incorporate feedbacks in an environment to help regulate the system, allowing it to organize itself into the most stable arrangement it can obtain with the materials it has available (Scheffer et al. 2001). Biosphere 2 was trying to create a CES that would become self-regulating and thus, self-stabilizing. The problem it encountered was not having the necessary feedbacks and transitions between ecosystems, as well as not providing enough buffering systems to allow for the ecosystems to change as they adjusted to the lack of dynamic interactions between them and other ecosystems. Biotic feedbacks are necessary for the promotion of a stable, resilient community. These feedbacks allow for "(1) temporal order; (2) hierarchy; and (3) the necessary relation between [an ecological system's] components" and the interaction it has with another system (Sabelli). Even as an ecosystem goes through a change of state due to disturbances and other physical events, the biotic feedbacks can cause the underlying biological processes to remain stable (Scheffer et al. 2001). This can occur through the use of fast and slow variables—components of a system that work or grow at different rates to counteract what is occurring in the other systems.

The second need involves the process by which the feedbacks are established. For a CES to be successful, it must be established through a process known as primary succession. This is the process whereby ecosystems evolve over many years from a rocky and lifeless condition to a fully functioning ecosystem comprised of microorganisms, plants, animals, and all of the geological aspects of the landscape, with all biogeochemical processes in full function. However, building a CES in space must be done in a shorter period of time than decades to hundreds of years. When properly performed in an expedited process, this will lead to an ecological system with functioning biogeochemical cycles.

The third need of the invention is to consider biodiversity; in this case, species diversity. Having a diverse group of species allows different services (e.g. food, soil revitalization) to be met within the system, on which humans and other living organisms depend. What one plant provides, another one may not. Diversity also allows for a continual presence of plants within the ecosystem. Fluctuations in temperature, soil nutrients, and such can cause the decrease in production of a species, or complete disappearance of one, while not affecting other species. This occurrence is explained by the Diversity-Stability Theory: "having multiple species present in a plant community can stabilize ecosystem processes if species vary in their responses to environmental fluctuations such that an increased abundance of one species can compensate for the decreased abundance of another" (Cleland 2012). More biodiversity in the CES allows for a continuation of function when a disturbance occurs within the system, allowing it to remain relatively stable. Less biodiversity could lead to an entire crop or species of plant being wiped out due to disease or another disturbance because there is not enough species and genetic biodiversity to prevent the effect from spreading.

Another element to consider with the biodiversity of the system is the interactions that occur between plants and other organisms within the system. Research to date includes systems created based on competition and others based on positive interactions—"interactions in which one species benefits from the presence of another species, without harm (and, potentially, with benefit) to the latter" (Halpern et al. 2007). These different views on interaction are the Western outlook (competition) versus the Russian outlook (positive), but both are essential to the function and structure of an ecosystem. Positive interactions promote intraspecific interactions that can occur over large scales of spatial heterogeneity. Even in a small enclosure, such as the beginnings of a CES, having interactions between species across the unit allows for links to form and a small type of exchange to occur across the landscape. Competition also promotes cross-ecosystem linkages to occur, and the promotion of the survival of the plants best suited for the environment. It might seem that one interaction is better or more necessary for the dynamics of the CES than the other; however, an ecosystem cannot survive without both types of interactions present among different species. These interactions allow spatial arrangements of species to naturally occur, allowing for a self-designing landscape that is best suited for the survival of the plants. Just having either competition or positive interactions present leads to a destabilizing of the system, such as what happened in Biosphere 2. A system with just competition could lead to the loss of important genetic diversity and biodiversity due to some species being stronger or more territorial than the others. Positive interactions alone create systems that lead to plants supporting and relying on each other for survival, which does not necessarily sound bad. However, if one interaction between two species were to suddenly cease, the entire system could fail due to a domino effect. For the system to be stable, constraints on positive interactions are needed. Competition as well as positive interactions are needed to balance the feedbacks that occur between the different plants in the ecosystem.

The final need of the invention is a result of limitations in size of the CES. We must consider that, on Earth, no ecosystem is truly closed. When studying the buffers that occur in open ecological systems, the buffer systems tend to be other ecosystems that provide material and interactions, or provide an outlet for biological movement between the systems. Such interactions between systems promote stability and a dynamic equilibrium in the system. However, limitations in time and resources prevent us from building a network of ecosystems. Manmade reservoirs provide the solution to this loss of natural dynamics and resilience. Manmade does not necessarily mean technology only, but reservoirs can be completely biological-based or a combination of the two. Manmade reservoirs can be designed to the needed scale and efficiency a CES requires for sustaining the main ecological system. However, caution needs to be taken when introducing such "coercion." Induced resilience can lead to threshold cascades through hiding the changes occurring in ecosystem dynamics that would not necessarily happen with natural resilience (Rist et al. 2014).

We will now propose an invention that solves all of the problems of the state of technology and meets all of these needs. It does this through the functions we find in the Earth ecosystem. The non-obvious nature of the invention, however, is not that it functions as an Earth ecosystem, but how it enables such function.

BRIEF SUMMARY OF THE INVENTION

The Three-Zone Model

The Three-Zone Model is based upon the way humans live on earth. An ecological system in which humans live not only has the city as a human habitation zone and the agricultural zone where crops are grown in and around the habitation zone, but it also has an ecological buffer zone of wild nature that encloses the city and the agricultural areas. An examination of any small town and, indeed, any colony started by humans throughout recorded history reveals the same pattern. Each zone of the Three-Zone Model carries out different functions and components of an ecological system. All three zones are contained within a structure or collections.

1. The habitation zone is similar to the central town, where the living and working quarters of the humans are located, including the technology humans use to manage the system. Like a city, it is the central place where the humans live and sleep. It tends to be a place where humans consume most of their resources and where human waste is produced as humans pursue their endeavors. It provides living quarters of the humans, as well as the base executive areas, engineering areas, and mission operations areas. The habitation zone is isolable from the other two zones for the purpose of controlled process evolutions and emergencies. As such, it has the ability to sustain life in the short-term using engineered ECLS systems that are used for backup and emergency.

2. The next zone is the agricultural zone. The core purpose of this zone is to provide food and resource production that enable the base to be independent of Earth. It is where the crops are grown, harvested, and initially prepared for use by the humans. The equipment used for fertilizing and tilling the soil, planting seeds, and harvesting crops is stored and used here. Insect and small-animal management also occurs in this zone. The necessary natural functions that are needed are as pollinators (e.g., bees, butterflies, and beetles), decomposers (e.g. worms), and predators (e.g. spiders and snakes). It is also a place where industrial activity occurs with raw materials from the agriculture and in-situ source. In-situ sources mined from outside of the dome system can provide the materials for making pottery, brick, glass, stone work, and inorganic chemicals. In general, it is the place where humans do much of the work they need to do to produce the usable resources necessary to survive off-Earth.

3. The ecological buffer zone consists of a more diverse set of plant species. The plants are allowed to grow wild and randomly throughout the zone. The plants are selected to cover the support services that are to be provided by the zone. The plants and landscape provide biogeochemical nutrient cycles, as well as provide resilience and stability. The ecological buffer zone provides the regulating services that are necessary to manage the byproducts of the industrial and domestic activity of the humans and agricultural activity of plants. This enables the ecological buffer zone to shape the dynamics of the fast supply production occurring in the agricultural zone and fast waste production occurring in the habitation zone. These regulating services include decomposition of excess waste plant matter to recover nutrients for reuse, collection of water runoff and nutrient erosion from the agricultural zone, sequestration of excess carbon in plant growth, and stabilizing the overall ecosystem of plants against environmental stressors. Finally, the ecological buffer zone provides the cultural services of a natural floral ecological system that are not available in the extreme environments of space that will help prevent psychological fatigue in the humans and will provide a natural recreation area.

Expedited Primary Succession

The agriculture zone and the ecological buffer zone are established in the invention by a process called expedited primary succession. This is a process whereby the invention transitions the spaces set aside for agricultural and ecological buffer zones within the dome system from bare rock, mineral sand, and rock shard and dust to a climax community ecosystem. The process is as follows:

1. The first step of expedited primary succession in the invention is the introduction of the necessary elements to start the supporting biogeochemical cycles: pressurize the dome system to 40% Earth atmospheric pressure with in-situ carbon dioxide gas, inoculate the regolith with microorganisms, and mix in phosphorus from Grade A biosolids and in-situ minerals.

2. The second step is a series of watering, drying, and tilling sequences with the regolith at the same time that the microbial inoculum and fertilizer are introduced, using water harvested from frozen in-situ resources. This causes the regolith's rock shard and dust particles to clump. This allows for aeration of the regolith and gaps in the regolith for plant roots to spread.

3. For the third step, we seed the agricultural and ecological buffer zones with a great variety of early sequence primary succession plants, such as lichens, mosses, and algae. We include some species of intermediate sequence grasses and later sequence legumes that are self-pollinating species. Once the initial plants have grown to seed through a season, we plow all of the plants under and immediately plant another season of the same plants, as well as intermediate sequence species of plants that are known to be hardy in rocky soil and cool and dry climates. We continue the process of growing plants to seed and tilling them under for as many cycles as is necessary to develop an O Horizon in the soil profile.

4. The fourth step is to plant the agricultural zone with the first crop of food plants, and plant the ecological buffer zone with intermediate and late sequence plants, including bushes. The agricultural zone and the plants in the agricultural zone are now maintained using standard practices of agronomy from Earth. The insects are now introduced to support the pollination of plants that require such support. Worms are introduced to help with decomposition in the soil. Small animals are introduced to manage the insect population. Later, low-profile trees suited for dry and cool climates are introduced. The agricultural zone plots can be moved around within the system over time. The plants in the ecological buffer zone are allowed to grow wild.

Competitive Redundancy

This element of the invention is comprised of a design element and a process element. Whereas the entire system is setup to be self-supportive, this element of the invention operates on the ecological principle of competition and the engineering principle of redundancy.

1. The design element requires that on the order of 1000 species of plants from cool and dry climates on Earth be introduced into the ecological buffer zone during the fourth step of the expedited primary succession process. The plants are then allowed to grow wild and compete while under the influence of the alien environment of lower gravity and higher radiation levels. The objective is to allow the ecosystem evolve to become a thriving one that is adapted to that once alien environment. In the course of this evolution and adaptation, many of the plant species will likely fail. But the competitive redundancy will ensure that vital ecosystem services are conserved.

2. The process element requires that any crop in the agricultural zone that begins to fail is replaced with a crop of a food plant that is succeeding under wild growth conditions in the ecological buffer zone. This does not eliminate the failed agricultural plant from the ecological system, but moves it into the ecological buffer zone to give it a chance to compete, adapt, and succeed.

Ecological Service Reservoirs

Considering the limits in size of the ecological buffer zone, to keep the system in balance and to mitigate the risk of system instability due to discrete production swings, the invention includes ecological service reservoirs—separately controlled locations in the ecological buffer zone that are setup to provide supporting, regulating, and provisionary services.

1. Carbon supply/oxygen sink reservoir—comprised of (1) an oxygen gas tank that collects excess oxygen from the oxygen supply/carbon sink reservoir and (2) a composting chamber with decomposing microorganisms and solid plant matter of food scraps from the habitation zone, harvest and food production waste from the agricultural zone, and excessive plant detritus from the ecological buffer zone.

2. Oxygen supply/carbon sink reservoir—comprised of (1) a carbon dioxide gas tank that collects excess carbon dioxide from the carbon supply/oxygen sink reservoir and in-situ atmospheric sources and (2) a plant starting chamber used to sprout plants prior to transplanting to the agricultural zone.

3. Phosphorous/nitrogen/potassium supply reservoir—comprised of (1) a nitrogen gas tank holding nitrogen from in-situ atmospheric sources and (2) a fertilizer storage chamber holding finished compost soil from the composting chamber of the carbon supply/oxygen sink reservoir; treated human waste from the black water treatment system of the habitation zone containing phosphorous, nitrogen, and potassium; and phosphates, nitrites, and nitrates mined from in-situ sources.

4. Non-potable water supply/phosphorous sink reservoir—comprised of a non-potable water tank that collects organic-phosphorous-laden leachate from the liner system under the ecological buffer zone, excess non-potable water from the water treatment system of the habitation zone, and filtered water mined from in-situ sources.

5. Provision supply reservoir—comprised of food and plant product storage from excess production in the agricultural zone.

6. Heat Supply/Sink Reservoir—comprised of a subground space and medium that holds heat that captures heat during the day from the Sun and releases heat back to the dome system atmosphere at night.

DETAILED DESCRIPTION OF THE INVENTION

Three-Zone Model

Figure 1:
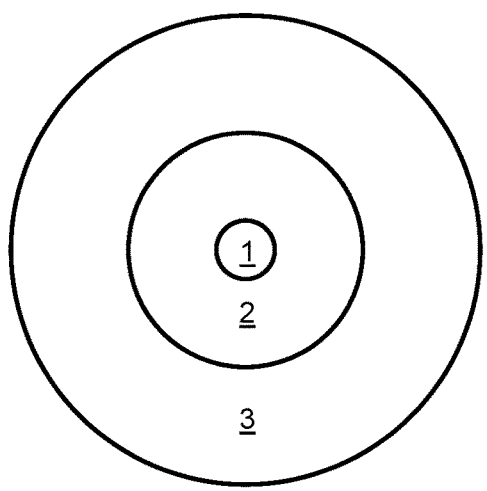
FIG. 1 illustrates the Three-Zone Model in a contiguous ring configuration.

The Three-Zone Model assumes it is contained within a structure or connected campus of structures called the dome system with engineered ECLS systems that have been built to site-specific requirements. The dome system is on or just under the surface of an off-Earth body, such as the Moon or Mars. The surface location allows it to take advantage of natural lighting from the sun that passes through the transparent areas of the dome or if under the surface, the light is piped in through a shallow (~1-3 meters) layer of regolith that covers some or all of the dome system. The structure is sealed both above and below ground to minimize the loss of air and water to the outside environment, and contains sufficient insulation to manage temperature levels to conditions required for life. The dome system and engineered ECLS systems, though important to the overall function of the Three-Zone Model, are not the key to the problems that this invention solves. However, the invention is setup within the context of the structures and engineered ECLS systems and could utilize the proposals of various futurists, space agencies, companies, and patent holders for both structures and engineered ECLS systems (e.g., the European Space Agency's MELiSSA).

The Three-Zone Model is comprised of all the known elements from a natural human ecosystem—contained within the dome system in a closed configuration. This configuration allows the maintenance of Earth-like conditions of atmospheric pressure, atmospheric constituent gases, humidity, temperature, and lighting, while allowing controlled intake of local in-situ resources from the outside environment and controlled removal of any excess buildup of recycled resources. The elements of the human ecosystem are modeled as three zones: habitation zone, agricultural zone, and ecological buffer zone. Each zone of the Three-Zone Model carries out different functions and components of an ecological system.

The habitation zone is the living and office quarters of the humans. Like a city, it is the central place where the humans live and sleep. It tends to be a place where humans consume most of their resources and where human waste is produced as humans pursue their endeavors, such waste being in the form of heat, carbon dioxide, non-food scraps from living and working, food scraps from eating, gray water from domestic and industrial processes, and bodily wastes/black water. The habitation zone contains engineered ECLS systems and is a typical habitation system provided by any company and built to any government or industry standard or patent. These engineered ECLS systems are initially used for primary life support when humans first arrive and then transition into backup/emergency support.

The habitation zone contains the private living quarters of the humans, as well as the base executive areas, engineering areas, and mission operations areas. Office space for the executive staff are provided here along with space for the computer and electronic network systems that enable command of base staff, control of base operations, and communication within the base and back to Earth. It also contains the engineering staff working spaces, the ECLS systems, the computer and network equipment used for monitoring and control of the ECLS systems, and maintenance spaces for base facilities and equipment. Finally, mission operations areas provide office space, collaboration space, and laboratory space for all elements of the base mission.

The habitation zone is isolable from the other two zones for the purpose of controlled process evolutions and emergencies. As such, it has the ability to sustain life in the short-term. Using the engineered ECLS systems, this zone can generate electrical power; maintain temperature, humidity, and oxygen levels; scrub toxins from the air; purify and recycle gray water and black water; collect non-recyclable waste, and grow food. However, due to the problems stated earlier, this life-sustaining ability is short-term without resupply and at-risk. The time limit and risks of such a system are why the Three-Zone Model includes the next two zones that habitation systems proposed in other patents do not provide.

The next zone is the agricultural zone. The core purpose of this zone is to provide food and resource production that enable the base to be independent of Earth. It is where the crops are grown and initially prepared for use by the humans. Insect and small-animal management also occurs in this zone. It is also a place where industrial activity occurs with raw materials from the agriculture and in-situ source. In general, it is the place where humans do much of the work they need to do to produce the usable resources necessary to survive off-Earth.

Plants are scientifically tested, selected, and brought to the base from Earth based upon the uses of the plants as crop resources, their ability to survive and thrive in an alien environment of lower gravity and higher radiation levels, and their dispositions to not become pests to humans and plants. All of the elements of plant husbandry occur in this zone. This includes soil preparation and planting, monitoring and maintaining plant and soil health and fitness, and harvesting of the crops. The equipment used for fertilizing and tilling the soil, planting seeds, and harvesting crops is stored and used here. The agricultural zone is also used to operate and maintain agriculture tools and equipment. Either low-tech or high-tech equipment or tools can be used. For high-tech equipment, separate climate controlled rooms can be set up for computer and network equipment used to monitor the agriculture and operate automated agricultural systems.

Basic harvest crop preparation also occurs here. Basic crop harvest production areas are provided in this zone for food, medicine, non-edible material, and seeds for next season. Crops undergo separation from the non-usable portions of the plant and basic washing. These crops are then moved to a provision supply reservoir, discussed below in the section on ecological service reservoirs.

To support the overall function of the Three-Zone Model, insects and small-animals are scientifically tested, selected, and brought to the base from Earth based upon their function in nature, their ability to survive and thrive in an alien environment of lower gravity and higher radiation levels, and their dispositions to not become pests to humans and plants. The necessary natural functions that are needed are as pollinators (e.g., bees, butterflies, and beetles), decomposers (e.g. worms), and predators (e.g. spiders and snakes). In particular, bee hives are maintained in the agricultural zone where the honey can be harvested. Once set loose into the dome system, it is important to monitor and maintain their population levels. The agricultural zone is used to raise the insects and animals in captivity and release them as more are needed in the functioning system.

It is also a place where industrial activity occurs with raw materials. Examples of industrial production associated with crops include fabric mills, oil presses, and organic chemicals. In-situ sources mined from outside of the dome system can provide the materials for making pottery, brick, glass, stone work, and inorganic chemicals. Either low-tech or high-tech equipment could be used. Isolation areas can be set up within the agricultural zone for various industrial operations for safety purposes.

The last zone is the ecological buffer zone. The core purpose of this zone is to provide the overall system with a buffering capacity to handle the environmental control and life support load put on the system by the habitation and agricultural zones without having to operate the engineered ECLS systems in the habitation zone. This reduces the need for spare parts and replacement consumable components for the ECLS systems, which can enable the base to become independent of Earth. It provides essential biogeochemical processes, feedbacks, and functions to the entire system to keep it self-sustaining and resilient. In ecosystem theory, these are called ecological services and are categorized as provisionary, supporting, regulating, and cultural. Whereas the agricultural zone provides most of the provisionary services of the system in the form of crop products, the ecological buffer zone provides the other three types of services.

The ecological buffer zone consists of a more diverse set of plant species. These plants are provided a much lesser effort of human husbandry than plants in the agricultural zone. The plants are allowed to grow wild and randomly throughout the zone. The arrangement and landscaping of the zone is such that it surrounds portions of the agricultural zone at both slightly higher elevations and slightly lower elevations to provide support services in the form of the movement of nutrients and water. The plants are selected to cover the support services that are to be provided by the zone. In such a configuration and selection, the plants and landscape provide self-sustaining nutrient cycles of oxygen, carbon, phosphorous, nitrogen, and water—to name a few—, as well as provide resilience and stability when large production swings occur for any of these nutrients; nutrients that cannot be managed by limited engineered ECLS systems that are not designed to support greater levels of human activity. The nutrient cycles are driven by a combination of the scientifically selected species of plants and microorganisms (e.g. lichens, mosses, and *rhizobium* bacteria and *mycorrhizae* fungus) that grow in the ecological buffer zone. Photosynthesis in living plants and decomposition by microorganisms drive the carbon cycle and oxygen cycle, maintaining steady atmospheric oxygen levels relative to carbon dioxide, even when the agricultural zone is at the peak of oxygen production, a particularly hazardous condition when such an ecological buffer zone is not present. Nitrogen in the atmosphere, symbiotic nitrogen-fixing and nitrifying microorganisms in the soil, and plant uptake of nitrogen from the soil drive the nitrogen cycle. The ecological buffer zone also participates in the phosphorous and water cycles as organicphosphorous-laden water runoff from the agricultural zone passes into the ecological buffer zone for distribution throughout the lower-elevation landscape and percolates down through the developing soil horizons to a collection liner and reclamation tank, from which it can be pumped for reuse of the organic-phosphorus-laden water as irrigation in agricultural zone and "rain" in the ecological buffer zone.

The ecological buffer zone provides the regulating services that are necessary to manage the byproducts of the industrial and domestic activity of the humans and agricultural activity of plants. The slow changing variables of regulating services (e.g. the concentration of soil organic matter) provided by the ecological buffer zone stabilize the ecological system against fast changing variables of the habitation and agricultural zones (e.g. crop production) that can be disruptive to the workings of the system and create an imbalance in supplies and demands (Walker et al. 2012). This enables the ecological buffer zone to shape the dynamics of the fast supply production occurring in the agricultural zone and fast waste production occurring in the habitation zone. These regulating services include decomposition of excess waste plant matter to recover nutrients for reuse, collection of water runoff and nutrient erosion from the agricultural zone, sequestration of excess carbon in plant growth, and stabilizing the overall ecosystem of plants against localized environmental stressors and species-specific stressors through plant pheromones and root networks with lichen and *mycorrhizae* fungus. Thus, overall ecosystem health is maintained.

Finally, the ecological buffer zone provides the cultural services of a natural floral ecological system that are not available in the extreme environments of space. The wilderness of the ecological buffer zone is necessary for the physiological and psychological well-being of the humans. Humans living within the habitation system will be able to look or walk out of the living and working space of the habitation and agricultural zones into a surrounding green landscape that is constantly changing with plant growth. Having an open area that is like a wilderness on Earth provides familiarity and a change of scenery to the current environment outside of the structure and will help prevent directed attention fatigue, commonly experienced by astronauts in space over time who do not experience a distinct visual cue that captures their attention automatically without having to force themselves to focus (Gunga 283) The residents will be able to do all of the activities that humans on Earth do out in nature without the constraints of a containment suit, limited only by the size of the system and the landscape contained within the system. From a landscape perspective, the dome system can be built to include different types of landscape, such as hills, rocky outcrops, and streams and ponds.

From a size perspective, the following criteria apply to the Three-Zone Model:

1. On Earth, the average number of trees needed to offset the annual oxygen consumption of one human in an urban environment has been estimated to be 30 trees on average, providing a net oxygen supply accounting for a range of tree sizes, forest conditions (combination of growing and decomposing trees), and latitudes (light conditions) (Nowak, Hoehn, & Crane, 2007). With roughly half the light intensity of Earth, estimate that twice as many trees are needed on Mars: about 60 trees per human.

2. For fruit tree spacing, optimum tree height is half the distance to the next tree plus three feet (Autio et al., 1991). Plan to select small-caliper fruit trees of 13 to 14 feet in height that would need a 20 to 22 foot square, which is a 6 meter×6 meter square (36 square meters per tree).

3. For human food sustainment on vegetables in low-yield conditions, 0.07 hectares of agricultural land is needed per human (Engelman et al., 2000).

4. For human habitation and work space, 40 square meters is estimated to be needed per human (Johnson & Holbrow, 1975).

The following are the calculations for the space requirements for a Three-Zone Model on Mars, assuming the need to support eight humans:

1. The habitation zone would be 320 square meters of living space (8 humans×40 square meters per human), which equates to a 20-meter diameter central hub. The modules connected to this would be sized for additional work space.

2. The agricultural zone would be 5600 square meters (8 humans×0.0700 hectares per human).

3. The ecological buffer zone would be 17,280 square meters (8 humans×60 trees per human×36 square meters per tree). This gives sufficient space for trees, bushes, and other ground cover plants to grow. This equates approximately to a 3 to 1 ratio of ecological buffer zone surface area to agricultural zone surface area under the dome.

4. Total space required under the dome system is 23,200 square meters.

The following are some of the possible arrangements that the Three-Zone Model could take. The three zones can be arranged in any way, as long as the total area of each zone meets the requirements for space for that zone. Increasing the total perimeter length of the boundaries between the sections of the agricultural zones and ecological buffer zones can provide better ecological intensification of the agriculture, providing greater yields (Pywell, et al., 2015).

1. FIG. 1 provides an arrangement with the Three-Zone Model laid out in concentric circles, the radius of the outer ecological buffer zone circle (3) is about two times the radius of the inner agricultural zone circle (2), with the innermost habitation zone circle (1) being about one quarter the radius if the agricultural zone.

Figure 2:
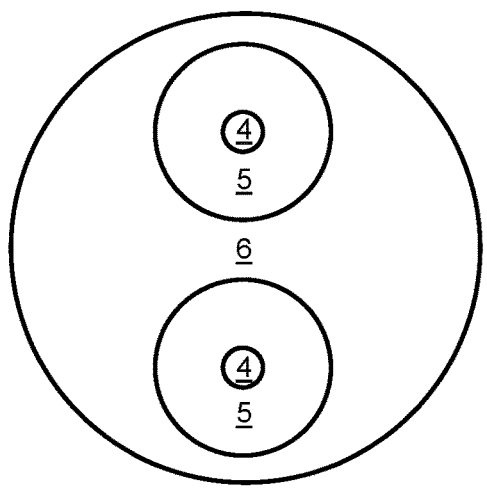
FIG. 2 illustrates the Three-Zone Model with the habitation zone and agricultural zone both divided into subzones.

2. FIG. 2 shows how the habitation zone (4) and the agricultural zone (5) could be broken upon into subzones, with all subzones being enclosed by surrounding ecological buffer zone area (6).

Figure 3:
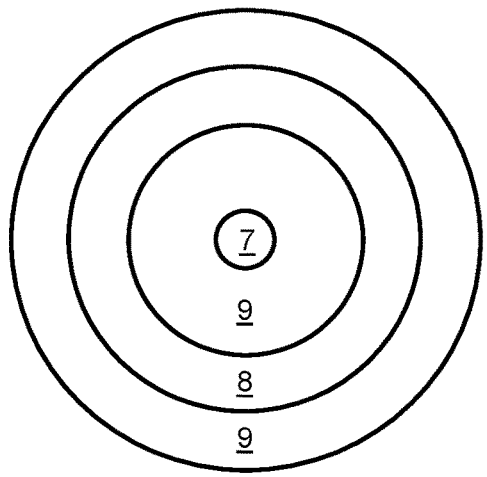
FIG. 3 illustrates the Three-Zone Model with the ecological buffer zone broken up into subzones.

3. FIG. 3 shows that the ecological buffer zone (9) may also consist of subzones, such as a ring between a habitation zone (7) central circle and the agricultural zone (8) ring, as well as an ecological buffer zone ring outside of the agricultural zone.

Figure 4:
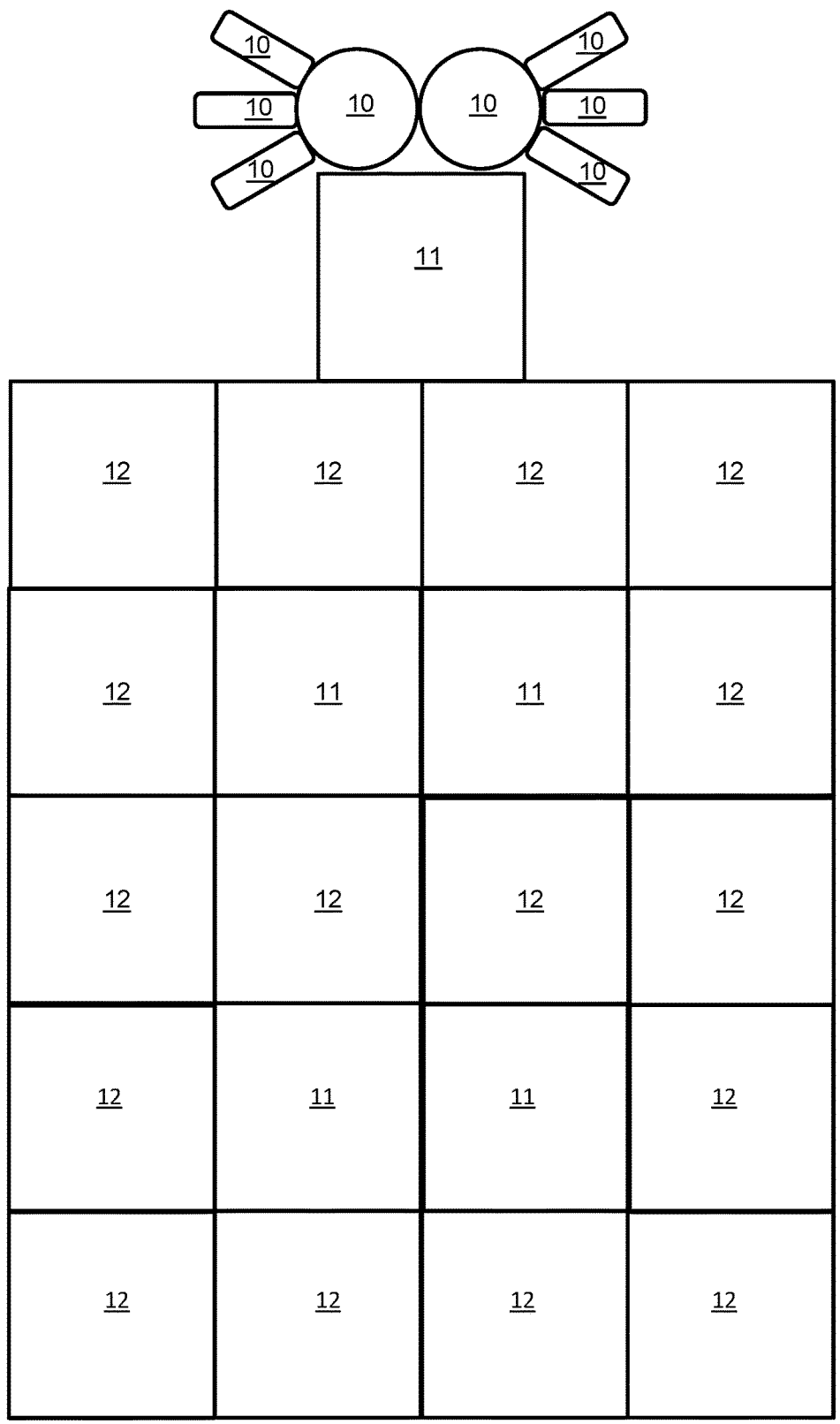
FIG. 4 illustrates the Three-Zone Model in a rectilinear configuration.

4. FIG. 4 shows that the zones do not have to be circular, but could be any shape. In this arrangement, the habitation zone (10) is made up of systems that are built on Earth and brought to Mars, with the agricultural zone (11) and ecological buffer zone (12) under separate rectilinear dome structures. This type of configuration allows for the agricultural zone and ecological buffer zone to be built section by section in order to gradually achieve the overall size as in-situ materials and/or materials shipped from Earth become available.

5. To reduce the size and surface area of the dome system, vertical cultivation technologies and landscape architectures that increase the surface area to volume ratio of the agricultural zone and ecological buffer zone could be used.

Expedited Primary Succession

The agriculture zone, the ecological buffer zone, and the ecological services are established in the invention by a process called expedited primary succession. This is a process whereby the invention transitions the spaces set aside for agricultural and ecological buffer zones within the dome system from bare rock, mineral sand, and rock shard and dust to a climax community ecosystem. Though primary succession has been studied for many years (e.g., Warming 1895, Cowles 1901, Ernst 1908, Griggs 1933, Coaldrak 1962, Eggler 1971, Chapin 1994, Garcia de Leon 2016), there is still consensus lacking on various aspects. The invention takes the available hypotheses on all of the proposed mechanisms of succession and organizes them into a process that is accelerated by human intervention.

The first step of expedited primary succession in the invention is the introduction of the necessary elements to start the supporting biogeochemical cycles. The first element is to pressurize the isolated portion of the dome system containing the agricultural and ecological buffer zones to at least 40% Earth atmospheric pressure by both sublimation of water vapor and carbon dioxide from the regolith under the dome and by the introduction of gaseous carbon-dioxide and nitrogen harvested from both gaseous and frozen sources outside of the dome or supplied from Earth. The second element is to introduce microorganisms (e.g. bacteria and fungi) commonly found in the beginning of primary succession and that have been scientifically demonstrated to function in Earth environments with similar conditions (i.e., cold and dry) as well as in low-gravity and high radiation conditions. We include nitrogen-fixing bacteria, nitrifying bacteria, and mycorrhizal fungi species with the initial inoculum. We introduce this inoculum into the ecological buffer and agricultural zones. The nitrogen fixing bacteria and nitrifying bacteria are one element necessary to expedite establishing the development of a nitrogen cycle. Mycorrhizal fungi help in the uptake of nutrients and water by plants and in establishing the ecosystem root network important for the health of plants. The third element is the introduction of one or two different sources of phosphorous into the system. One source is a Grade A biosolids-based fertilizer made from freeze-sterilized human feces. The second is mined in-situ apatite, if available. The phosphorous sources are added to the regolith where mycorrhizal fungi can help turn it into an organic form that can be taken up by plants. The fertilizer also adds extra nutrients, such as potassium and sulfur, and aids in establishing the pioneer microbial and plant species.

The second step is a series of watering, drying, and tilling sequences with the regolith at the same time that the microbial inoculum and fertilizer are introduced, using water harvested from frozen in-situ resources. Water is introduced to the regolith and mixed thoroughly to a depth reasonable for first plant growth—150 cm max. The regolith is then allowed to dry. It is then tilled. This causes the regolith's rock shard and dust particles to clump to allow for aeration—to support the nitrogen, carbon, and oxygen cycles—and water percolation—to support the water cycle. This also aids in plant development, considering plant roots need soil with micro and macro-pores to develop to full maturity. This cycle is repeated with watering, drying, and tilling to break the clumped, cemented regolith into larger chunks resembling clumped soil. The process is repeated as many times as needed until large chunks are present.

For the third step, we seed the agricultural and ecological buffer zones with a great variety of early sequence primary succession plants, such as lichens, mosses, and algae. We include some species of intermediate sequence grasses and later sequence legumes that are self-pollinating species, all scientifically selected based on climate similarity on Earth and test results in low gravity and high radiation conditions. The legumes are nitrogen-fixing plants (e.g. legumes) that work with the nitrogen-fixing bacteria to expedite the establishment of the nitrogen cycle. The grasses will grow quickly and produce a great amount of biomass both above ground and below ground. The root systems of the grass along with the Mycorrhizal fungi establish the initial symbiotic root network in the soil. The growing of the plants also begins to establish the oxygen cycle.

Once the initial plants have grown to seed through a season, we plow all of the plants under to begin to establish an organic base to the soil using the plant litter. We immediately plant another season of the same plants, as well as intermediate sequence species of plants that are known to be hardy in rocky soil and cool and dry climates. We continue the process of growing plants to seed and tilling them under for as many cycles as is necessary to develop an O Horizon in the soil profile—turning inorganic material into a soil containing organic compounds. This process also establishes the carbon cycle. The microorganisms in the soil break down the plant matter, releasing the carbon as carbon-dioxide and methane gas.

The fourth step is to plant the agricultural zone with the first crop of food plants, and plant the ecological buffer zone with intermediate and late sequence plants, including bushes. The agricultural zone and the plants in the agricultural zone are now maintained using standard practices of agronomy from Earth. Agricultural crop rotation is used, as well as companion planting to enhance food production and continue to develop and maintain a fertile soil. The insects are now introduced to support the pollination of plants that require such support. Worms are introduced to help with decomposition in the soil. Small animals are introduced to manage the insect population. Later, low-profile trees suited for dry and cool climates are introduced for edible fruit, oxygen generation, and a visual break for human psychological health. The agricultural zone plots can be moved around within the system over time, thus enabling an approach that allows land to go fallow with the spread of the ecological buffer zone plants into the agricultural fields for a season or two to recover. The plants in the ecological buffer zone are allowed to grow wild. Once these practices are fully established, the system will tend toward stability. A self-sustaining system will provide ecosystem services for resilience and health to all the living organisms in the system.

Competitive Redundancy

Whereas the entire system is setup to be self-supportive, this element of the invention operates on the ecological principle of competition and the engineering principle of redundancy. In nature, there are both supportive relationships and competitive relationships. Two living things can function in a supportive symbiosis in which they use and even depend upon each other, providing each other with resources they need. Two living things can also compete for resources within the ecosystem that they need to survive. In engineering, vital portions of a system that must keep operating have redundant components or lines. In the event that one component/line fails, the redundant component/line can be brought online to keep the system operating. Competitive redundancy uses competition to ensure the best and strongest plants rise to the top of the ecosystem, then using these successful plants as redundant components for necessary functions of the overall system. The key here is that we have engineered the ecosystem to contain redundancy of ecological services that are provided by differing species of plants that are in competition with each other.

The invention is comprised of a design element and a process element. The design element is the selection of plants placed in the ecological buffer zone in the fourth step of the expedited primary succession process. Upwards of 1000 species of plants from cool and dry climates on Earth are sown in the ecological buffer zone. The selection will include lots of plant species that compete for natural resources, as well as plant species that provide the same ecosystem services. The plants are then allowed to grow wild and compete while under the influence of the alien environment of lower gravity and higher radiation levels. The objective is to allow the ecosystem to evolve and become a thriving one that is adapted to that once alien environment. In the course of this evolution and adaptation, many of the plant species will likely fail. But the competitive redundancy will ensure that vital ecosystem services are conserved. What will remain is a unique Martian ecosystem of plants.

The process element of competitive redundancy involves rotating failing crops in the agricultural zone with succeeding plants in the ecological buffer zone. As humans grow crops, some and possibly many of the crop plants will fail in the alien environment. If any agricultural crop begins to fail due to disease or unforeseen conditions induced by the alien environment, the great variety of plants being grown wildly and competitively in the ecological buffer zone can be evaluated for promotion to crop status in the agricultural zone. The promoted plant, though a different species from the failed plant, will be selected based upon successful growth in the ecological buffer zone and similarity of food, medicine, or material function, thus providing a redundant resource to the failed plant. This does not eliminate the failed agricultural plant from the ecological system. It will be placed out in the ecological buffer zone where it will be allowed to grow wild and compete, possibly adapting and evolving into a stronger species.

Ecological Service Reservoirs:

Considering the limits in size of the ecological buffer zone, as discussed above in the description of the Three-Zone Model, it is still possible for the system to drift out of optimum operating range when it comes to ecological services. To keep the system in balance and to mitigate the risk of system instability due to discrete production swings, the invention includes ecological service reservoirs—separately controlled locations in the ecological buffer zone that are setup to provide supporting, regulating, and provisionary services.

Carbon supply/oxygen sink reservoir—comprised of (1) an oxygen gas tank that collects excess oxygen from the oxygen supply/carbon sink reservoir and (2) a composting chamber with decomposing microorganisms and solid plant matter of food scraps from the habitation zone, harvest and food production waste from the agricultural zone, and excessive plant detritus from the ecological buffer zone. The natural process of decomposing results in the absorption of oxygen and the release of carbon dioxide and methane. During periods of excessive oxygen generation in the dome system, the decomposition chamber can be opened to the dome atmosphere to deplete oxygen levels relative to carbon-dioxide levels. When closed, the composting chamber operates by a controlled feed from the oxygen gas tank, capturing the carbon dioxide and methane from the resulting decomposing and piping them to gas tanks in the oxygen supply/carbon sink reservoir and energy reservoir, respectively.

Oxygen supply/carbon sink reservoir—comprised of (1) a carbon dioxide gas tank that collects excess carbon dioxide from the carbon supply/oxygen sink reservoir and in-situ atmospheric sources and (2) a plant starting chamber used to sprout plants prior to transplanting to the agricultural zone. During periods of excessive carbon dioxide generation in the dome system, the plant starting chamber can be opened to the dome atmosphere to deplete carbon dioxide levels relative to oxygen levels. When closed, the plant starting chamber operates by a controlled feed from the carbon dioxide gas tank, capturing the oxygen from the resulting early growth period of the plants and piping it to the gas tank in the carbon supply/oxygen sink reservoir.

Phosphorous/nitrogen/potassium supply reservoir—comprised of (1) a nitrogen gas tank holding nitrogen from in-situ atmospheric sources and (2) a fertilizer storage chamber holding finished compost soil from the composting chamber of the carbon supply/oxygen sink reservoir; treated human waste from the black water treatment system of the habitation zone containing phosphorous, nitrogen, and potassium; and phosphates, nitrites, and nitrates mined from in-situ sources. When agricultural zone land becomes nutrient depleted, fertilizer is taken from the reservoir and tilled into the soil. When closed, the fertilizer storage chamber operates by a minimal controlled feed from the oxygen gas tank in the carbon supply/oxygen sink chamber and from the nitrogen storage tank to support final low-grade composting, the fixing of nitrogen into the compost soil by nitrogen-fixing bacteria, and the nitrifying of nitrites into nitrates by nitrifying bacteria.

Non-potable water supply/phosphorous sink reservoir—comprised of a non-potable water tank that collects organic-phosphorous-laden leachate from the liner system under the ecological buffer zone, excess non-potable water from the water treatment system of the habitation zone, and filtered water mined from in-situ sources. When agricultural zone and ecological buffer zone require irrigation and "rain", respectively, water is pumped from the non-potable water collection tank. This returns the organic phosphorus that erodes from the agricultural and ecological buffer zones to active use for plant growth.

Provision supply reservoir—comprised of food and plant product storage from excess production in the agricultural zone. During challenging seasons of low food production, these stores can be used to get supply the humans until the next harvest season. In times of plenty with harvest, stored food rotation is used to consume these reserves in a first in, first out rotation. If robotic systems are used to build the dome systems, and perform the expedited primary succession process ahead of human arrival, robotics could also be used to plant and harvest one or more seasons of crops and store the supplies for human use upon arrival.

Heat Supply/Sink Reservoir—comprised of a sub-ground space and medium that holds heat. As the atmosphere in the dome system warms during the day from the Sun, the reservoir captures the excess heat. As the atmosphere in the dome system cools through the evening and night, the reservoir releases heat back to the dome system atmosphere. This maintains a moderate temperature range similar to cool and dry climates on Earth. When initially set up, the medium will achieve an average temperature based upon heat from within the planet and the heat load of the Sun on the dome system. Depending upon the heat storage medium being used, the size of the reservoir must be proportioned to the size of the dome system in order to establish a temperature range within the dome system that is healthy for the humans and plants.

Expansion:

Once the optimal balance of the overall system is achieved for self-sustaining, resilient, and healthy operations, the dome system can be expanded by duplicating the zones and ecological service reservoirs. This enables the population to grow. The larger the system becomes, the more resilient it becomes. More industrial activity enabling higher technology can be added by growing the size of the ecological buffer zones to handle the carbon load, thus minimizing losses of energy gained from solar and other sources by keeping the energy driven ecological support cycles contained within the dome system to the maximum extent possible.

Other Uses:

The invention can be configured for any moon, planet, or asteroid, as well as on a space craft. Regolith, water, and gases mined from our Moon, asteroids, and comets could be used onboard a spacecraft, in order to avoid the cost of launching such materials up from Earth. Expedited primary succession would be used to convert the regolith into a rich soil on the spacecraft.

The invention can be configured on Earth in extreme environments that challenge human survival, such as underwater ocean, tropical desert, arctic desert, and high-altitude mountain. The approach to making such a system on Earth would vary from the approach used for the Mars-based system.

Example: Food Security System in Somalia

The food security problem in a climate-change affected area on Earth, like Somalia, is a little simpler than providing food security on the Moon or Mars. The Somalia situation does have supply chain and inhospitable environment problems like space, though not as extreme. The supply chain problem is due to international finance politics and warlords preventing any consistent establishment of a food distribution system. The inhospitable environment problem is due to climate change causing a shortage of water, high temperatures year round, and a desertification of the landscape. However, unlike in space, Somalia does have native plants and native bugs. The following is how the invention is implemented in Somalia:

1. A closed dome system can be built from local materials, standard construction equipment shipped in from a neighboring country, and some special materials and additive manufacturing equipment provided by a company specializing in building desert structures using in-situ material. The resulting dome system would house the Three-Zone Model eco-agricultural system, sealed to the maximum extent possible from air and water loss with entrance through a simplified habitation zone that is space used to manage the food security system.

2. Once the dome system is built, the desiccated and possibly eroded soil throughout the agriculture zone and ecological buffer zone space is recovered using expedited primary succession. Microbe inoculations are prepared in lab and flown in to the location. A starter supply of non-potable water is trucked in from the coast or the Nile River. A starter supply of fertilizer comes from a local supply of bio-solids, sun-sterilized human and animal sanitary waste. Seeds are collected from as many native food and non-food plants as can be found within the region. Seeds of native plants can also be obtained from seed banks, all for the purpose of recovering the native agriculture and ecosystem that has been mostly lost to the drought. The local lichens, mosses, grasses, and legumes are used to reestablish the O Horizon, and then the agriculture crops are planted while the ecological buffer plants are sewn randomly for wild growth.

3. There is no unusual risk of crop failure, considering this is Earth and the plants being grown are native to the region. However, if crop failure does occur, wild growing food plants in the ecological buffer zone that are succeeding in competition can be domesticated into the agricultural zone.

4. The ecological service reservoirs that are built into the construction of the closed dome system are now used to keep the system resilient and healthy by maintaining oxygen levels in the safe range and moderating the temperature within the dome system. The only things that escape the system are some heat and reflected sunlight and some leakage of air with some water in the air. Beyond this, food is purposefully removed from the system to feed the local populations. In return, the local populations return the food scrap waste and continue to provide the sun-sterilized human and animal biosolid waste back to the food security system. There will be a need to provide makeup water to the system, though not nearly as much as for an open agricultural field. This makeup water can come from a water treatment system that is set up in the habitation zone of the system to treat the gray water and black water from the local population. The minimal amount of additional makeup water that is needed can be trucked in. This also captures the waste nutrients in the black water, which can be subsequently reused in the system. This approach maximizes use of the solar energy that is captured by the dome system, directing that energy into driving the support cycles within the ecological buffer zone and the ecological service reservoirs. This approach also keeps the cycling carbon within the dome system to the maximum extent possible, thus permanently sequestering a level of carbon within the system.

The technology used in the ecological service reservoirs can start out as low tech. The most complex technology needed right away is oxygen level sensors and whatever technology is used to generate electricity. Beyond this, the needed technology is water pumps and piping systems, fans and ventilation ducts, and manually operated louvres for opening and closing the oxygen and carbon reservoirs to the atmosphere of the dome system.

5. The dome system can be expanded as the population demands it. As it expands, it recovers more of the desert land that was lost to climate change, continuing to sequester more carbon in the new growth of plants within the domes.

6. The dome system can also be expanded to add industrial activity to the agricultural zone. This can be done by building industrial spaces around the outside of the dome and directing exhaust into the dome system and expanding the dome system to include more ecological buffer zone. This helps capture carbon from the industrial activity. Adding trees to the ecological buffer zone also increases the capacity to capture carbon and keep the air within the dome system fresh.

REFERENCES

Allen, J. *Biosphere 2: Description, Purpose and Conceptual Design*. A keynote address at the International Conference of Life Support and Biospherics at the University of Alabama in Huntsville, co-sponsored by NASA Marshall Space Science Center. (1992).

Autio, Wesley R., Duane W. Greene, Daniel R. Cooley, and James R. Schupp. "Improving the growth of newly planted apple trees." *HortScience* 26 (1991): 840-43. Web.

Chapin, F. S., Lawrence R. Walker, Christopher L. Fastie, and Lewis C. Sharman. *Mechanisms of Primary Succession Following Deglaciation at Glacier Bay, Alasks*. Ecological Monographs 64 (1994): 149-175. Web.

Clay, R. A. *Green is good for you*. American Psychological Association 32, 40 (2001).

Cleland, E. E. *Biodiversity and Ecosystem Stability*. Nature Education Knowledge 3, 228-233 (2012).

Coaldrake, J. E. *The coastal sand dunes of southern Queensland. Proceedings of the Royal Society of Queensland* 72: 101-116 (1962).

Cowles, H. C. *The physiographic ecology of Chicago and vicinity: a study of the origin, development, and classification of plant societies*. Botanical Gazette 31:73-108, 145-182 (1901).

Eggler, W. A. *Quantitative studies of vegetation on sixteen young lava flows on the island of Hawaii*. Tropical Ecology 12: 66-100 (1971).

Engelman, Robert, Richard P. Cincotta, Bonnie Dye, Tom Gardner-Outloaw, and Jennifer Wisnewski. *People in the Balance: Population and Natural Resources at the Turn of the Millenium*. Publication. Washington: Population Action International, 2000. Print.

Ernst, A. 1908. *The new flora of the volcanic island of Krakatau*. (Translation by A. C. Seward), (Cambridge University Press, Cambridge, UK, 1908).

Garcia de Leon. *Symbiont dynamics during ecosystem succession: co-occurring plant and arbuscular mycorrhizal fungal communities*. FEMS Microbial Ecol 92(7) (2016).

Gitelson, I. I., Lisovsky, G. M., & MacElray, R. D. in *Manmade Closed Ecological Systems* (eds Kleber, P. & Greenleaf, J.), (Taylor & Francis Inc, New York, 2003).

Griggs, R. F. *The colonization of the Katmai ash, a new and inorganic soil*. American Journal of Botany 20: 92-113 (1933).

Gunga, H. in *Human Physiology in Extreme Environments* (Academic Press, Oxford, 2015).

Halpern, B., Silliman, B., Olden J. et al. *Incorporating positive interactions in aquatic restoration and conservation*. Frontiers in Ecology and the Environment 5, 153-160 (2007).

*HI-SEAS—Hawaii Space Exploration Analog and Simulation: Simulating long duration Mars missions here on Earth*. University of Hawaii, (2012). Web. Mar. 2015.

Johnson, R. D., and C. Holbrow, eds. *Space Settlements: A Design Study*. Washington: National Aeronautics and Space Administration, 1975. Print.

National Aeronautics and Space Administration. *NASA's Journey to Mars: Pioneering Next Steps in Space Exploration*. NASA. National Aeronautics and Space Administration, 2015. Web.

Nowak, David J., Robert Hoehn, and Daniel E. Crane. "Oxygen production by urban trees in the United States." *Arboriculture & Urban Forestry* 3rd ser. 33 (2007): 220-26. *United States Department of Agriculture Forest Service*. 10 May 2007. Web. 10 Jul. 2017.

Pickett, S. & Cadenasso, M. *Linking ecological and built components of urban mosaics: an open cycle of ecological design*. Journal of Ecology 96, 8-12 (2008).

Pywell, Richard F., Matthew S. Heard, Ben A. Woodcock, Shelley Hinsley, Lucy Ridding, Marek Nowakowski, and James M. Bullock. "Wildlife-friendly farming increases crop yield: evidence for ecological intensification." *Proceedings of the Royal Society B: Biological Sciences* 282.1816 (2015): n. pag. *NCBI*. Web. 10 Jul. 2017.

Rist, L., Felton, A., Nyström, M. et el. *Applying resilience thinking to production ecosystems*. Ecosphere 5, 1-11 (2014).

Sabelli, H. Biotic Feedback: *Priority and Supremacy in Nature, Science, and Society*. The series Bios and the Cybernetics of creative system, special issue for cybernetics and semiotics edited by Hector Sabelli.

Scheffer, M., Carpenter, S., Foley, J. et al. *Catastrophic shifts in ecosystems*. Nature 413, 591-596 (2001).

Thompson, T. & Huot, D. *NASA Astronaut Scott Kelly Talks One-Year Mission in Final In-Space News Conference*. NASA TV. National Aeronautics and Space Administration, 2016. Web Walker, B., Carpenter, S., Rockstrom, J. et al. *Drivers, "Slow" Variables, "Fast" Variables, Shocks, and Resilience*. Ecology and Society 17, 1-4 (2012).

Warming, E. *Plantesamfund: Grundtrk af den økologiska Plantegeografi*. Philipsen, Copenhagen (1895).

Zakri, A. H. & Watson, R. *Ecosystems and Human Well-being: A Framework for Assessment. Millennium Ecosystem Assessment*, 49-70 (2003).

The invention claimed is:

1. A system for a self-sustaining and resilient human habitation on the Moon and Mars and for food security and climate change mitigation anywhere on Earth, comprising:
   a habitation zone where humans are quartered;
   an agricultural zone providing 700 square meters of food growing space per human;
   and an ecological buffer zone approximately three times the area of the agricultural zone that contains a wild growth of plants and provides the remaining ecological services that Earth life needs to live self-sufficiently and resiliently.

2. The system of claim 1 wherein the agricultural zone and ecological buffer zone are established by a process known as expedited primary succession, comprising the steps of:
   the introduction of carbon dioxide gas, microorganisms, and phosphorous-bearing biosolids and in-situ minerals;
   the repetitive process of watering, drying, and tilling the regolith to produce soil clumping for aeration and plant root growth;
   the repetitive process of seeding, growing, and tilling the regolith under with self-pollinating early sequence plant species, intermediate sequence grasses and other plants, and late sequence legumes to establish an O Horizon in the soil profile;
   and the organized planting of the agricultural zone with the first agricultural crops and the random and scattered planting of ecological buffer zone with intermediate and late sequence plants and bushes allowed to grow wild, the introduction of bugs and small animals, and the eventual introduction of low-profile trees with one in every 16 meter square area of the ecological buffer zone.

3. The system of claim 1 wherein the plants in agricultural zone and ecological buffer zone are sustained by competitive redundancy, comprising:
   a design element in which the ecological buffer zone is planted with on the order of 1000 species for the purpose of establishing a system that is both supportive and competitive
   and a process element in which failing crops in the agricultural zone are exchanged with succeeding wild-growth food plants in the ecological buffer zone to ensure the continued production of food and the strengthening of plant genetics by competition.

4. The system of claim 1 wherein resiliency is established and instability mitigated within the system by ecological service reservoirs using technology and biology, comprising:

a carbon supply/oxygen sink reservoir;
an oxygen supply/carbon sink reservoir;
a phosphorous/nitrogen/potassium supply reservoir;
a non-potable water supply/phosphorous sink reservoir;
a provision supply reservoir;
and a heat supply/sink reservoir.

* * * * *